United States Patent
Xia et al.

(10) Patent No.: US 11,301,282 B2
(45) Date of Patent: Apr. 12, 2022

(54) INFORMATION PROTECTION METHOD AND APPARATUS

(71) Applicant: Huawei Technologies Co., Ltd., Shenzhen (CN)

(72) Inventors: Yubin Xia, Shanghai (CN); Jinfeng Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 16/545,941

(22) Filed: Aug. 20, 2019

(65) Prior Publication Data

US 2019/0370054 A1    Dec. 5, 2019

Related U.S. Application Data

(63) Continuation of application No. PCT/CN2017/106675, filed on Oct. 18, 2017.

(30) Foreign Application Priority Data

Feb. 21, 2017  (CN) .......................... 201710093800.6

(51) Int. Cl.
  *G06F 9/455*    (2018.01)
  *G06F 21/55*    (2013.01)

(52) U.S. Cl.
  CPC ........ *G06F 9/45558* (2013.01); *G06F 21/554* (2013.01); *G06F 2009/45583* (2013.01); *G06F 2009/45587* (2013.01); *G06F 2221/034* (2013.01)

(58) Field of Classification Search
  None
  See application file for complete search history.

(56) References Cited

U.S. PATENT DOCUMENTS

| 9,483,742 | B1 | 11/2016 | Ahmed | |
| 10,261,854 | B2* | 4/2019 | Deutsch | ................ G06F 11/073 |
| 10,447,728 | B1* | 10/2019 | Steinberg | ................ H04L 63/20 |
| 10,514,943 | B2* | 12/2019 | Asbe | ........................ G06F 21/79 |
| 2012/0255013 | A1 | 10/2012 | Sallam | |
| 2020/0364158 | A1* | 11/2020 | Banginwar | ............. G06F 9/485 |

FOREIGN PATENT DOCUMENTS

| CN | 104468568 A | 3/2015 |
| CN | 105740044 A | 7/2016 |
| CN | 105956465 A | 9/2016 |
| CN | 106055385 A | 10/2016 |

OTHER PUBLICATIONS

Machine Translation and Abstract of Chinese Publication No. CN104468568, Mar. 25, 2015, 8 pages.

(Continued)

*Primary Examiner* — Kenneth Tang
(74) *Attorney, Agent, or Firm* — Conley Rose, P.C.

(57) ABSTRACT

An information protection method includes receiving a request message sent by a virtual machine (VM), sending the request message to a VM instance corresponding to the VM or the shared service module, determining whether there is attack information included in the request message, and deleting the VM that sends the request message and the VM instance corresponding to the VM.

20 Claims, 4 Drawing Sheets

(56) References Cited

OTHER PUBLICATIONS

Machine Translation and Abstract of Chinese Publication No. CN105740044, Jul. 6, 2016, 12 pages.
Machine Translation and Abstract of Chinese Publication No. CN105956465, Sep. 21, 2016, 7 pages.
Machine Translation and Abstract of Chinese Publication No. CN106055385, Oct. 26, 2016, 17 pages.
Jin, X., et al., "FTXen: Making Hypervisor Resilient to Hardware Faults on Relaxed Cores," IEEE 21st International Symposium on High Performance Computer Architecture, Feb. 7-11, 2015, pp. 451-462.
Wang, Z., et al., "Isolating Commodity Hosted Hypervisors with HyperLock," EuroSys'12 Proceedings of the 7th ACM European conference on Computer Systems, Apr. 10-13, 2012, 14 pages.
Keller, E., et al. "NoHype: Virtualized Cloud Infrastructure without the Virtualization," ISCA'10 Proceedings of the 37th annual international symposium on Computer architecture, Jun. 19-23, 2010, 12 pages.
Azab, A., et al., "SKEE:A Lightweight Secure Kernel-level Execution Environment for ARM," NDSS '16, Feb. 21-24, 2016, 15 pages.
Foreign Communication From a Counterpart Application, PCT Application No. PCT/2017/106675, English Translation of International Search Report dated Jan. 19, 2018, 2 pages.
Foreign Communication From a Counterpart Application, PCT Application No. PCT/2017/106675, English Translation of Written Opinion dated Jan. 19, 2018, 5 pages.
Foreign Communication From a Counterpart Application, European Application No. 17898022.3, Extended European Search Report dated Feb. 12, 2020, 9 pages.

* cited by examiner

INFORMATION PROTECTION METHOD AND APPARATUS

CROSS-REFERENCE TO RELATED APPLICATIONS

This application is a continuation of International Application No. PCT/CN2017/106675, filed on Oct. 18, 2017, which claims priority to Chinese Patent Application No. 201710093800.6, filed on Feb. 21, 2017. The disclosures of the aforementioned applications are hereby incorporated by reference in their entireties.

TECHNICAL FIELD

The present disclosure relates to the field of virtualization technologies, and in particular, to an information protection method and apparatus.

BACKGROUND

A system architecture related to virtualization technologies generally includes physical hardware 1, a Virtual Machine Monitor (VMM) 2, and a plurality of Virtual Machines (VM) 3 shown in FIG. 1A. The physical hardware 1 is usually a hardware resource on a physical host. The VMM 2 may be responsible for management and allocation of all hardware resources, and provide mutual isolation between a plurality of running VMs 3. In this way, a plurality of operating systems can run on a single physical host, thereby improving utilization of hardware resources. In addition, because the VMM has a highest priority in the system, once the VMM has a vulnerability or an error, or the VMM is under attack, a serious security threat is caused to the entire physical host, for example, a denial of service attack, VM escape, or information leakage.

Currently, to avoid a problem that information security of the entire physical host is threatened when the VMM has a vulnerability or an error or when the VMM is under attack, the physical host allocates resources such as a CPU, a memory, and a virtual device to a VM when creating the VM, isolates memories of different VMs using an Extended Page Table (EPT), and isolates Input/Output (I/O) using a virtual hardware function provided by hardware. In this way, after being started, the VMs are mutually isolated based completely on a function provided by the hardware, and run independently.

However, because isolation between the plurality of VMs is implemented using the hardware function, a relatively large limitation is imposed on use. In addition, because resources that support running of the VM are allocated in advance, flexibility of subsequent resource scheduling is reduced. For example, load balancing cannot be implemented between physical CPUs, and a memory cannot be dynamically allocated. As a result, utilization of resources is reduced, and a greatest advantage of a virtualization platform is lost.

SUMMARY

To avoid a problem that information security of an entire physical host is threatened when a VMM has a vulnerability or an error or when a VMM is under attack, embodiments of the present disclosure provide an information protection method and apparatus. The technical solutions are as follows.

According to a first aspect, an information protection method is provided, and is applied to an information protection apparatus. The information protection apparatus includes a VMM and a plurality of VMs, the VMM includes a Memory Management Unit (MMU) control module, a plurality of VM instances, and a shared service module, the plurality of VM instances are in a one-to-one correspondence with the plurality of VMs, and the MMU control module, the plurality of VMs, and the shared service module are mutually independent and isolated.

The method includes sending, by the MMU control module when receiving a request message sent by any one of the plurality of VMs, the request message to a target module based on context information carried in the request message, where the target module includes a VM instance corresponding to the VM or the shared service module, determining, by the target module based on the request message if the target module receives the request message, whether there is attack information, sending, by the target module when there is the attack information, an information protection notification message to the MMU control module, where the information protection notification message carries a VM identifier, and the VM identifier is used to identify the VM that sends the request message, and deleting, by the MMU control module when receiving the information protection notification message, the VM that sends the request message and the VM instance corresponding to the VM.

It should be noted that the context information may include a value of a register, an event parameter, and the like. In addition, the VM identifier is used to uniquely identify the VM, and the VM identifier may be address information of the VM, a name of the VM, or the like.

It should be noted that in this embodiment of the present disclosure, the VMM is divided into a plurality of mutually independent and isolated modules. The VMM is divided into the shared service module, the MMU control module, and the plurality of VM instances. The shared service module, the MMU control module, and the plurality of VM instances are mutually independent and isolated. Therefore, the attack information occurring in the VMM is limited in a single independent module, and another domain module is not affected, so as to implement information protection.

Optionally, the MMU control module includes a detection unit.

The sending, by the MMU control module when receiving a request message sent by any one of the plurality of VMs, the request message to a target module based on context information carried in the request message includes parsing, by the detection unit when receiving the request message sent by any one of the plurality of VMs, the context information carried in the request message, to determine an event type of an event requested by the request message, and determining, based on the event type, the target module from the VM instance corresponding to the VM and the shared service module, and outputting the request message to the target module It should be noted that the detection unit may include a gatekeeper, where the gatekeeper is a message ingress provided by the MMU control module for the outside.

Optionally, after the parsing the context information carried in the request message, the method further includes determining whether the request message meets a security rule, where the security rule is used to describe a condition for accessing the VMM, and when the request message meets the security rule, determining, based on the event type, the target module from the VM instance corresponding to the VM and the shared service module, and outputting the request message to the target module, or when the request message does not meet the security rule, sending error notification information to the VM that sends the request message, to notify the VM of an error cause of the request message.

It should be noted that the security rule may be set in advance. For example, the security rule is that the request message does not carry a designated parameter, or that the request message carries security verification information.

Optionally, the security rule is that the request message carries the security verification information.

The determining whether the request message meets a security rule includes determining whether the context information carried in the request message includes the security verification information, and when the context information includes the security verification information, determining that the request message meets the security rule, or when the context information does not include the security verification information, determining that the request message does not meet the security rule.

Optionally, the security rule is that the request message does not carry the designated parameter, and the designated parameter is a parameter that cannot be processed by the VMM.

The determining whether the request message meets a security rule includes determining whether the context information of the request message carries the designated parameter, and when the request message does not carry the designated parameter, determining that the request message meets the security rule, or when the request message carries the designated parameter, determining that the request message does not meet the security rule.

Optionally, the determining, based on the request message, whether there is attack information includes processing the request message, and when the target module is the shared service module, and the shared service module detects an update operation of designated data in a process of processing the request message, determining that there is the attack information.

After the processing the request message, the method further includes, when the target module is the VM instance, and a running error of the VM instance occurs in a process of processing the request message, determining that there is the attack information.

In the shared service module, the designated data is data exclusively occupied by the shared service module, and the designated data is in a read-only mode in the shared service module, in other words, the designated data is unchangeable data. Therefore, when the shared service module detects the update operation of the designated data in the process of processing the request message, it may be determined that there is the attack information.

It should be noted that the designated data may be set in advance. For example, the designated data may be an interrupt vector table, a data structure mapping, an error processing function, or setting information of page table permission.

Optionally, when the target module is the shared service module, and the shared service module detects no update operation of the designated data in the process of processing the request message, it is determined that there is no attack information. In this case, the shared service module may send a processing result of the request message to the VM instance or the MMU control module based on the context information of the request message.

Optionally, the processing the request message includes, when the target module is the VM instance, and the context information is used to indicate that the VM instance accesses information shared by the plurality of VM instances, processing, by the VM instance, the request message, to obtain a first update request message.

Correspondingly, after the processing the request message, the method further includes sending the first update request message to the shared service module when no running error of the VM instance occurs in a process of processing the request message, receiving, by the shared service module, the first update request message, and processing the first update request message, and when the shared service module detects an update operation of designated data in a process of processing the first update request message, determining that there is the attack information.

Because the shared service module may simultaneously receive a plurality of update request messages, to facilitate subsequent operations of the MMU control module, the shared service module may determine, using an error processing function, a module having the attack information.

Optionally, the shared service module receives the first update request message, and processes the first update request message. When detecting no update operation of the designated data in the process of processing the first update request message, the shared service module may determine that there is no attack information. In this case, the shared service module may send a processing result of the first update request message to the VM instance or the MMU control module based on the context information of the first update request message.

Optionally, the processing the request message includes, when the target module is the VM instance, and the context information is used to indicate that the VM instance accesses hardware information controlled by the MMU control module, processing, by the VM instance, the request message, to obtain a second update request message.

Correspondingly, after the processing the request message, the method further includes sending the second update request message to the MMU control module when no running error of the VM instance occurs in a process of processing the request message, receiving, by the MMU control module, the second update request message, and processing the second update request message, determining, by the MMU control module in a process of processing the second update request message, whether the second update request message meets the security rule, and when the second update request message does not meet the security rule, determining, by the MMU control module, that there is the attack information.

The MMU control module is a TCB (Trusted Computing) in this embodiment of the present disclosure. To ensure information security, the MMU control module may perform security check on any received request message. Therefore, when processing the second update request message, the MMU control module may determine whether the second update request message meets the security rule. The trusted computing base is a set of all security protection mechanisms for implementing computer system security protection, and is considered as the only one secure and trusted module in the system.

Optionally, when the second update request message meets the security rule, the MMU control module determines that there is no attack information. In this case, the MMU control module may process the second update request message.

According to a second aspect, an information protection apparatus is provided, and the information protection apparatus has a function of implementing a behavior in the information protection method in the first aspect. The information protection apparatus includes at least one module, and the at least one module is configured to implement the information protection method provided in the first aspect.

According to a third aspect, a physical host is provided, and the physical host includes a transmitter, a receiver, a storage, and a processor. The storage, the transmitter, and the receiver are separately connected to the processor. The storage stores program code. The processor is configured to invoke the program code, so as to perform the foregoing information protection method in the first aspect.

According to a fourth aspect, a computer storage medium is provided, configured to store a computer software instruction used in the physical host provided in the third aspect. The computer storage medium includes a program designed for performing the first aspect.

The technical solutions provided in the embodiments of the present disclosure bring the following beneficial effects. In the embodiments of the present disclosure, the VMM includes the shared service module, the MMU control module, and the plurality of VM instances, and the shared service module, the MMU control module, and the plurality of VM instances are mutually independent and isolated. Therefore, when the VMM receives the request message sent by any one of the plurality of VMs, and determines that there is the attack information, the MMU control module may directly delete the VM that sends the request message and the VM instance corresponding to the VM, thereby avoiding impact of the attack information on another module, and implementing information protection.

DESCRIPTION OF EMBODIMENTS

To make the objectives, technical solutions, and advantages of the present disclosure clearer, the following further describes the implementations of the present disclosure in detail with reference to the accompanying drawings.

Figure 1A:
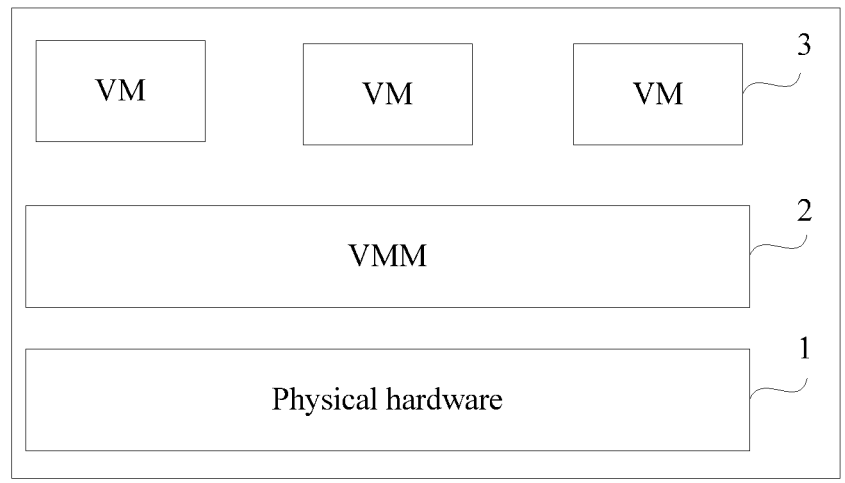
FIG. 1A is a schematic structural diagram of a system architecture of virtualization technologies according to an embodiment of the present disclosure.
Figure 1B:
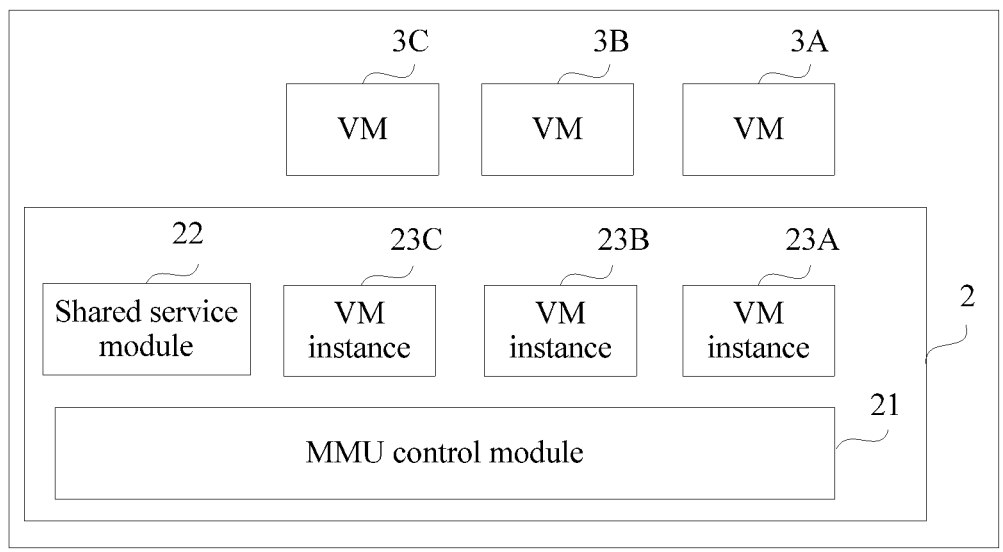
FIG. 1B is a schematic structural diagram of an architecture of an information protection system according to an embodiment of the present disclosure.

A system architecture of embodiments of the present disclosure is first described before the embodiments of the present disclosure are described in detail. FIG. 1B shows an architecture of an information protection system according to an embodiment of the present disclosure. The system architecture is used on a physical host, and includes a VMM 2 and a plurality of VMs. The VMM 2 includes an MMU control module 21, a shared service module 22, and a plurality of VM instances 23. The plurality of VM instances are in a one-to-one correspondence with the plurality of VMs. The MMU control module, the plurality of VMs, and the shared service module are mutually independent and isolated. The plurality of instances may include an XEN instance, a KVM instance, and the like. In FIG. 1A and FIG. 1B, three VMs and three VM instances are used as examples for description, and are not construed as any limitation on the present disclosure. For example, as shown in FIG. 1B, a VM instance 23A is corresponding to a VM 3A, a VM instance 23B is corresponding to a VM 3B, and a VM instance 23C is corresponding to a VM 3C.

In this embodiment of the present disclosure, the MMU control module, the shared service module, and the plurality of VM instances may be obtained, through division, from the VMM by nested MMU virtualization technologies. The MMU control module is responsible for mutual isolation between all modules in the entire VMM. The MMU control module includes access control code used to perform an update operation on the MMU, in other words, the MMU control module may include hardware information related to physical hardware. Further, the MMU control module may manage and control data of the shared service module and the plurality of VM instances. The MMU control module is a TCB in this embodiment of the present disclosure, and the MMU control module is the only one secure and trusted module. The shared service module stores information shared by the plurality of VM instances. For example, the shared information may include a global physical page description array used to record information related to a physical memory, and the information shared by the plurality of VM instances may be obtained by mapping the plurality of VMs corresponding to the plurality of VM instances to the shared service module during creation of the VMs. Therefore, the shared service module can provide a shared service for the plurality of VM instances. The shared service may include VM scheduling, communication between the plurality of VMs or physical memory allocation and management of the plurality of VMs, and the like. Any one of the plurality of VM instances is configured to store running information of a corresponding VM, such as an instruction simulation function, I/O request processing, exception processing, and virtual machine page table update. Mutual isolation between the plurality of VM instances is also ensured by the MMU control module.

Figure 1C:
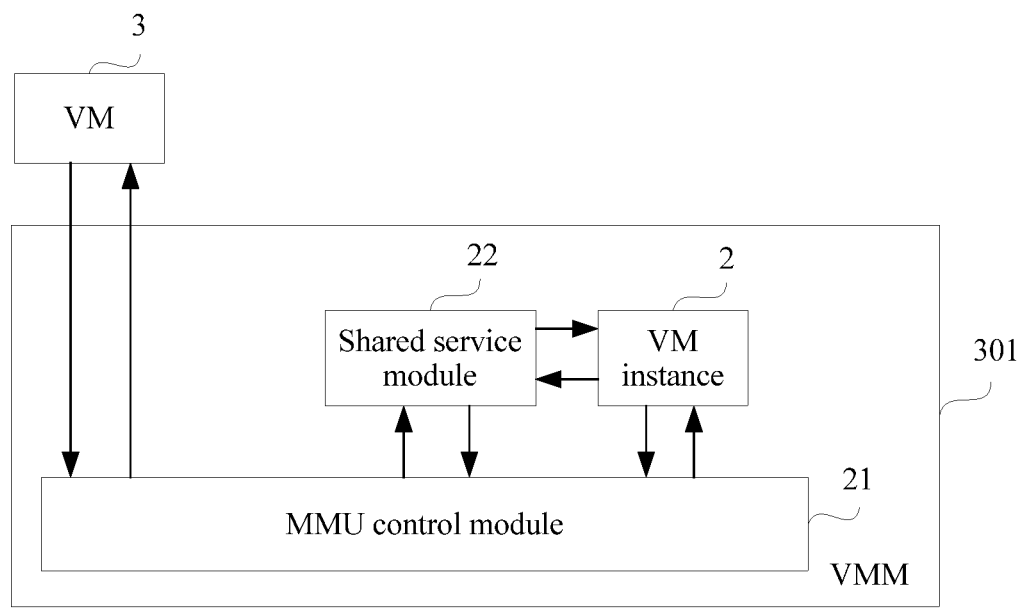
FIG. 1C is a schematic diagram of a processing direction of a request message according to an embodiment of the present disclosure.

In addition, when there is no attack information, after the VM instance sends a request message to the VMM, for a processing direction of the request message, refer to FIG. 1C. In FIG. 1C, a VM instance 2 and a VM 3 are used as an example for description. The MMU control module 21 may send the request message to the shared service module 22 or the VM instance 2 corresponding to the VM 3. If the VM instance 2 receives the request message, and processes the request message, the VM instance 2 may send a processing result of the request message to the MMU control module 21 based on context information of the request message, so that the MMU control module 21 performs an update operation. Alternatively, the VM instance 2 sends a processing result of the request message to the MMU control module 21, and the MMU control module forwards the processing result of the request message to the VM 3. Alternatively, the VM instance may send a processing result of the request message to the shared service module, so as to obtain shared information in the shared service module. If the shared service module receives the request message, and processes the request message, the shared service module sends a processing result of the request message to the MMU control module, so that the MMU control module performs an update operation. Alternatively, the shared service module sends a processing result of the request message to the MMU control module, and the MMU control module forwards the processing result of the request message to the VM. Alternatively, the shared service module sends a processing result of the request message to the VM instance, so that the VM instance continues to perform a related processing operation based on the processing result of the request message.

Figure 1D:
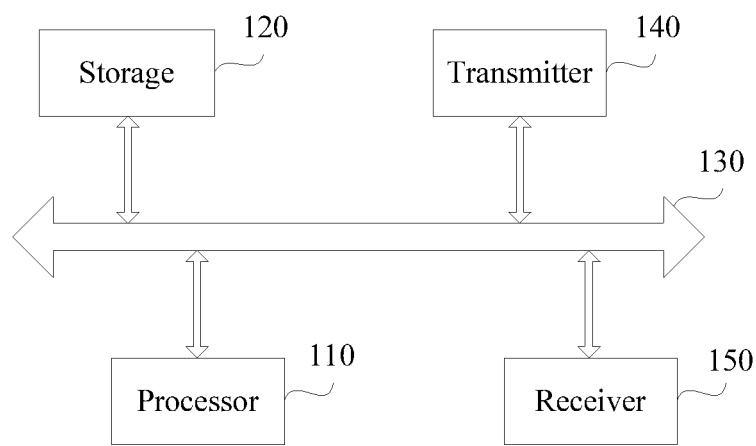
FIG. 1D is a schematic structural diagram of a physical host according to an embodiment of the present disclosure.

FIG. 1D is a schematic structural diagram of a physical host according to an embodiment of the present disclosure. The physical host mainly includes a processor 110 having one or more processing cores, a storage 120 having one or more computer readable storage media, a communications bus 130, a transmitter 140, a receiver 150, and the like. The storage 120, the transmitter 140, and the receiver 150 are separately connected to the processor 110 using the communications bus 130. A person skilled in the art may understand that a structure of the physical host shown in FIG. 1D does not constitute a limitation on the physical host. The physical host may include more or fewer components than those shown in the figure, or combine some components, or have different component arrangements. This is not limited in this embodiment of the present disclosure.

The processor 110 is a control center of the physical host. The processor 110 may be a general-purpose central processing unit (CPU), a microprocessor, an application-specific integrated circuit (ASIC), or one or more integrated circuits that are configured to control program execution of the solution of the present disclosure. The storage 120 is configured to store program code used to perform the solution in this application. The processor 110 may run or execute the program code stored in the storage 120, and invoke data stored in the storage 120, so as to implement an information protection method provided in an embodiment shown in FIG. 2.

The storage 120 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a BLU-RAY disc, and the like), a disk storage medium or another magnetic storage device, or any other medium that can be used to carry or store expected program code in a form of an instruction or a data structure and that can be accessed by an integrated circuit. However, the storage 120 is not limited herein. The storage 120 may exist independently, and is connected to the processor 110 using the communications bus 130. The storage 120 may alternatively be integrated with the processor 110.

The transmitter 140 and the receiver 150 are a communications interface in the physical host, or may be any apparatus such as a transceiver, and are configured to communicate with another device or a communications network, such as an Ethernet network, a radio access network (RAN), or a wireless local area network (WLAN).

In addition, the communications bus 130 may include a channel that transmits information between the processor 110, the storage 120, the transmitter 140, and the receiver 150.

In specific implementation, in an embodiment, the physical host may include a plurality of processors, for example, the processor 110 shown in FIG. 1D. Each of the processors may be a single-core (single-CPU) processor, or may be a multi-core (multi-CPU) processor. The processor herein may be one or more devices, circuits, and/or processing cores for processing data (for example, a computer program instruction).

The foregoing physical host may be a general-purpose physical host or a dedicated physical host. In specific implementation, the physical host may be a server or the like. This embodiment of the present disclosure imposes no limitation on a type of the physical host.

Figure 2:
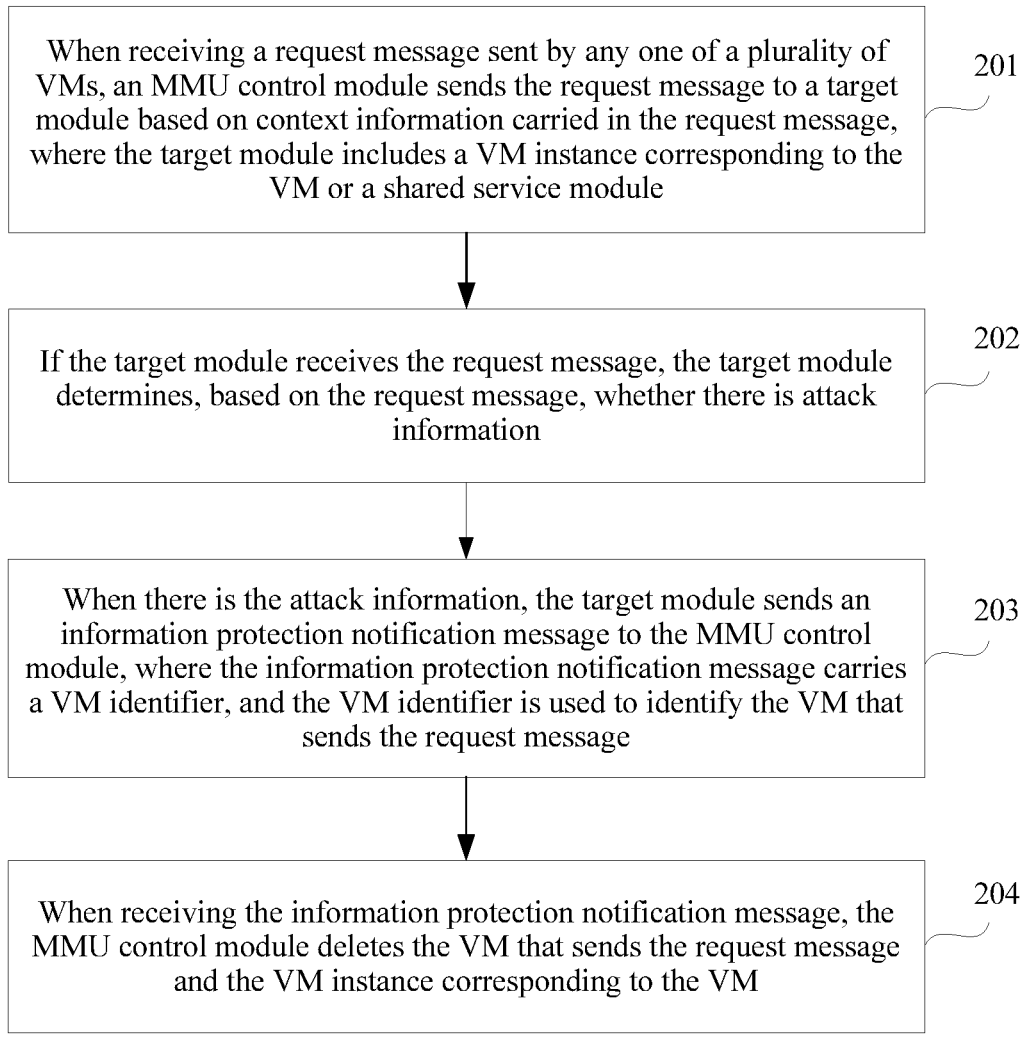
FIG. 2 is a flowchart of an information protection method according to an embodiment of the present disclosure.

FIG. 2 is a flowchart of an information protection method according to an embodiment of the present disclosure. Referring to FIG. 2, the method is applied to an information protection apparatus, and the information protection apparatus includes a VMM and a plurality of VMs. The VMM includes an MMU control module, a plurality of VM instances, and a shared service module. The plurality of VM instances are in a one-to-one correspondence with the plurality of VMs. The MMU control module, the plurality of VMs, and the shared service module are mutually independent and isolated. The method includes the following steps.

Step 201: When receiving a request message sent by any one of the plurality of VMs, the MMU control module sends the request message to a target module based on context information carried in the request message, where the target module includes a VM instance corresponding to the VM or the shared service module.

Generally, when the plurality of VMs are in a one-to-one correspondence with the plurality of VM instances, because the plurality of VMs implement different functions, the VMM needs to provide a plurality of message ingresses for the outside, to receive request messages sent by the VMs with different functions. In this embodiment of the present disclosure, to enable the MMU control module to manage all the request messages together, the plurality of different message ingresses may be replaced with one message ingress provided by the MMU control module for the outside. For example, an interrupt descriptor table (IDT) is modified, so that a plurality of message ingresses of processing functions for all interrupts and exceptions in the plurality of VMs are replaced with one message ingress provided by the MMU control module for the outside. An interface field of a virtual machine control structure (VMCS) is modified, so that the interface field executes one message ingress provided by the MMU control module for the outside. Therefore, when receiving the request message, the MMU control module may send the request message to the target module based on the context information carried in the request message.

It should be noted that, after the plurality of message ingresses are replaced with one message ingress, it can be ensured that the VMM can be accessed only using the one message ingress, and an update operation on the MMU is performed only using the one message ingress, thereby improving information security.

It should be noted that the context information may include a value of a register, an event parameter, and the like.

The context information includes the value of the register, the event parameter, and the like that can indicate an event type, and each event type is corresponding to a module. Therefore, when receiving the request message, the MMU control module may parse the context information, to determine a type of an event requested by the request message, determine a module corresponding to the event type based on the event type, and determine the module corresponding to the event type as the target module, and send the request message to the target module.

The MMU control module may include a detection unit. Therefore, an operation of sending, by the MMU control module when receiving the request message sent by any one of the plurality of VMs, the request message to the target module based on the context information carried in the request message may include the following steps. When receiving the request message sent by any one of the plurality of VMs, the detection unit parses the context information carried in the request message, to determine an event type of an event requested by the request message, determines, based on the event type, the target module from the VM instance corresponding to the VM and the shared service module, and outputs the request message to the target module.

It should be noted that the detection unit may include a gatekeeper, where the gatekeeper is a message ingress provided by the MMU control module for the outside.

For example, when any one of the plurality of VMs sends the request message to the VMM, the detection unit may parse the context information of the request message, to determine the event type of the event requested by the request message. When the event type is accessing an internal data structure of a VM instance, the VM instance is determined as the target module, and the detection unit outputs the request message to the VM instance. When the event type is obtaining information shared by the plurality of VM instances in the shared service module, the shared service module is determined as the target module, and the detection unit outputs the request message to the shared service module.

Further, after parsing the context information carried in the request message, the detection unit may further determine whether the request message meets a security rule, where the security rule is used to describe a condition for accessing the VMM, and when the request message meets the security rule, determine, based on the event type, the target module from the VM instance corresponding to the VM and the shared service module, and output the request message to the target module, or when the request message does not meet the security rule, send error notification information to the VM that sends the request message, to notify the VM of an error cause of the request message.

It should be noted that the security rule may be set in advance. For example, the security rule is that the request message does not carry a designated parameter that cannot be processed by the VMM, or that the request message carries security verification information.

In a possible implementation, when the security rule is that the request message carries the security verification information, the detection unit may determine whether the context information carried in the request message includes the security verification information, and when the context information includes the security verification information, determine that the request message meets the security rule, or when the context information does not include the security verification information, determine that the request message does not meet the security rule.

In another possible implementation, when the security rule is that the request message does not carry the designated parameter, the detection unit may determine whether the context information of the request message carries the designated parameter, and when the request message does not carry the designated parameter, determine that the request message meets the security rule, or when the request message carries the designated parameter, determine that the request message does not meet the security rule.

Step 202: If the target module receives the request message, the target module determines, based on the request message, whether there is attack information.

In an embodiment, if the target module receives the request message, the target module processes the request message. When the target module is the shared service module, and the shared service module detects an update operation of designated data in a process of processing the request message, the target module determines that there is the attack information. When the target module is the VM instance, and a running error of the VM instance occurs in a process of processing the request message, the target module determines that there is the attack information.

In a possible implementation, when the target module is the VM instance, generally, the VM instance may process the request message, to obtain a processing result of the request message. The VM instance may send the processing result of the request message to the MMU control module, and the MMU control module may forward the processing result of the request message to a VM corresponding to the VM instance. In the foregoing process, all operations are related to only the VM and the instance corresponding to the VM. Therefore, when there is the attack information, and a running error of the VM instance is caused, only the VM instance is affected, and another module is not affected.

In another possible implementation, when the target module is the shared service module, in the shared service module, the designated data is data exclusively occupied by the shared service module, and the designated data is obtained after the shared service module applies, during initial creation, to the MMU control module for exclusively occupying a memory. In addition, the designated data is in a read-only mode in the shared service module, in other words, the designated data is unchangeable data. Therefore, when the shared service module detects the update operation of the designated data in the process of processing the request message, it may be determined that there is the attack information. In addition, because the designated data is in the read-only mode, the attack information cannot affect the designated data, so as to protect information in the shared service module.

It should be noted that the designated data may be set in advance. For example, the designated data may be an interrupt vector table, a data structure mapping, an error processing function, or setting information of page table permission. In addition, the update operation of the designated data may include operations such as changing, adding, and deleting the designated data.

In addition, when the target module is the shared service module, and the shared service module detects no update operation of the designated data in the process of processing the request message, it is determined that there is no attack information. In this case, the shared service module may send a processing result of the request message to the VM instance or the MMU control module based on the context information of the request message.

When the target module is the VM instance, in a process of processing the request message by the VM instance, the attack information may have attacked the VM instance to such a degree that no running error of the VM instance occurs. In this case, the VM instance cannot determine whether there is the attack information. Therefore, the VM instance may still send a processing result of the request message to the shared service module or the MMU control module. There may be two specific cases as follows.

In a first case, when the target module is the VM instance, and the context information is used to indicate that the VM instance accesses the information shared by the plurality of VM instances, the VM instance processes the request message, to obtain a first update request message. When no running error of the VM instance occurs in the process of processing the request message, the VM instance may send the first update request message to the shared service module. The shared service module receives the first update request message, and processes the first update request message. When detecting an update operation of designated data in a process of processing the first update request message, the shared service module determines that there is the attack information.

An example of protecting an interrupt vector table is used for description in the following.

Generally, because the interrupt vector table is a key data structure for recording a processing function of each interrupt, when the interrupt vector table is attacked by the attack information, the interrupt vector table may be directly cleared to protect data. Consequently, an information loss is caused. To avoid this case, in this embodiment of the present disclosure, information protection is performed in the following manner. A specific process is as follows.

When receiving a VM creation request, the MMU control module copies, from the shared service module, an address space as an address space of an XEN instance corresponding to the VM, and changes mapping of a data structure that needs to be protected. For example, the data structure that needs to be protected is an interrupt vector table.

The shared service module is responsible for an operation about the interrupt vector table, and the shared service module exclusively occupies a memory page of the interrupt vector table, in other words, the interrupt vector table is in a read-only mode in the shared service module. Therefore, when the request message received by the VM instance is accessing an internal data structure of the XEN instance, after processing the request message, the XEN instance may generate a first update request message for updating the interrupt vector table in the shared service module, and then the XEN instance may send the first update request message to the shared service module. In a process of processing the first update request message, the shared service module detects that a junk message is written into a virtual address of the interrupt vector table. In this case, because the virtual address of the interrupt vector table is in a read-only mode, the junk message cannot be written into the virtual address of the interrupt vector table, so that the interrupt vector table is protected, and the shared service module may determine that there is the attack information.

In addition, because the shared service module may simultaneously receive a plurality of update request messages, to facilitate subsequent operations of the MMU control module, the shared service module may determine, using an error processing function, a module having the attack information.

Further, the shared service module receives the first update request message, and processes the first update request message. When detecting no update operation of the designated data in the process of processing the first update request message, the shared service module may determine that there is no attack information. In this case, the shared service module may send a processing result of the first update request message to the VM instance or the MMU control module based on context information of the first update request message.

In a second case, when the target module is the VM instance, and the context information is used to indicate that the VM instance accesses hardware information controlled by the MMU control module, the VM instance processes the request message, to obtain a second update request message. When no running error of the VM instance occurs in the process of processing the request message, the VM instance sends the second update request message to the MMU control module. The MMU control module receives the second update request message, and processes the second update request message. The MMU control module determines, in a process of processing the second update request message, whether the second update request message meets the security rule. When the second update request message does not meet the security rule, the MMU control module determines that there is the attack information.

The MMU control module is a TCB in this embodiment of the present disclosure. To ensure information security, the MMU control module may perform security check on any received request message. Therefore, when processing the second update request message, the MMU control module may determine whether the second update request message meets the security rule.

In addition, when the second update request message meets the security rule, the MMU control module determines that there is no attack information. In this case, the MMU control module may process the second update request message.

Further, the attack information may be indicated not only by updating the designated data, or by that the processing result does not meet the security rule, but also by abuse of computing resources. To describe this embodiment of the present disclosure in more detail, an example of avoiding the abuse of the computing resources is used for description in the following.

The VMM has time-consuming operations that cannot be interrupted. Therefore, if the VM can trigger these operations at random, the attack information may trigger these operations more frequently. Consequently, a large quantity of computing resources are consumed in these operations, resources are wasted, and in a serious case, a CPU is unable to respond in a timely manner. To avoid this case, in this embodiment of the present disclosure, information protection is performed in the following manner. A specific process is as follows.

When an XEN instance is created, the MMU control module may map, to a fixed location in an address space of the XEN instance, a VM identifier that is in a read-only form and that is corresponding to the XEN instance. When the request message received by the VM instance is accessing an internal data structure of the XEN instance, after processing the request message, the XEN instance may generate and trigger a non-maskable interrupt, and the XEN instance may continuously send an update request message to the MMU control module or the shared service module. However, because the VM identifier corresponding to the XEN instance is in a read-only mode, the MMU control module or the shared service module may determine, based on the VM identifier, an XEN instance having the attack information.

It should be noted that the VM identifier is used to uniquely identify the VM, and the VM identifier may be address information of the VM, a name of the VM, or the like.

Step 203: When there is the attack information, the target module sends an information protection notification message to the MMU control module, where the information protection notification message carries a VM identifier, and the VM identifier is used to identify the VM that sends the request message.

When there is the attack information, the MMU control module may further trigger memory page error notification information, so as to notify a user that there is the attack information.

Step 204: When receiving the information protection notification message, the MMU control module deletes the VM that sends the request message and the VM instance corresponding to the VM.

When the MMU control module receives the information protection notification message, it indicates that there is the attack information. To ensure security of data in another module in the VMM, the VMM may delete the VM that sends the request message and the VM instance corresponding to the VM.

Further, after deleting the VM that sends the request message and the VM instance corresponding to the VM, the MMU control module may recreate a VM whose function is the same as that of the deleted VM and a corresponding VM instance.

In this embodiment of the present disclosure, the VMM is divided into a plurality of mutually independent and isolated modules. The VMM is divided into the shared service module, the MMU control module, and the plurality of VM instances. The shared service module, the MMU control module, and the plurality of VM instances are mutually independent and isolated. When any one of the plurality of VMs sends the request message, the MMU control module may send the request message to the corresponding VM instance or the shared service module based on the context information of the request message. The VM instance or the shared service module may process the request message, to determine whether there is the attack information. When there is the attack information, the information protection notification message is sent to the MMU control module. When receiving the information protection notification message, the MMU control module may directly delete the VM that sends the request message and the VM instance corresponding to the VM. Therefore, the attack information occurring in the VMM is limited in a single independent module, and another module is not affected, so as to implement information protection.

Figure 3A:
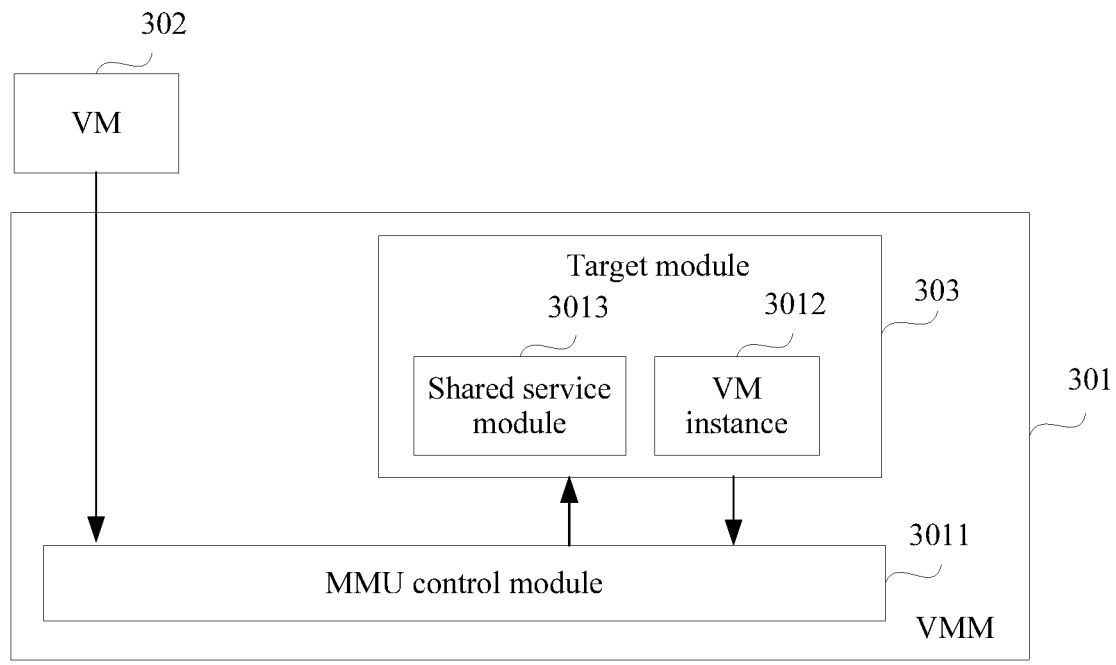
FIG. 3A is a schematic structural diagram of an information protection apparatus according to an embodiment of the present disclosure.

FIG. 3A is a schematic structural diagram of an information protection apparatus according to an embodiment of the present disclosure. Referring to FIG. 3A, the information protection apparatus includes, a VMM 301 and a plurality of VMs 302. The VMM 301 includes an MMU control module 3011, a plurality of VM instances 3012, and a shared service module 3013. The plurality of VM instances 3012 are in a one-to-one correspondence with the plurality of VMs 302.

The MMU control module 3011 is configured to perform step 201 in the embodiment in FIG. 2.

The target module 303 is configured to perform step 202 in the embodiment in FIG. 2.

The target module 303 is configured to perform step 203 in the embodiment in FIG. 2.

The MMU control module 3011 is configured to perform step 204 in the embodiment in FIG. 2.

Figure 3B:
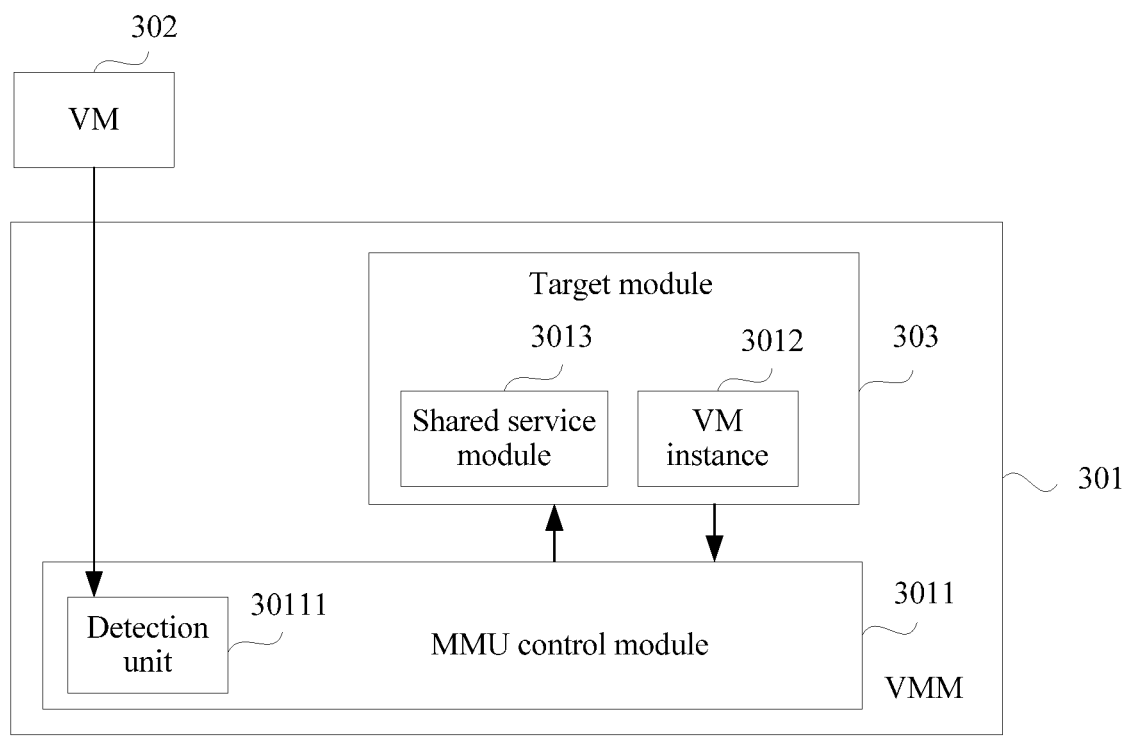
FIG. 3B is a schematic structural diagram of another information protection apparatus according to an embodiment of the present disclosure.

Optionally, referring to FIG. 3B, the MMU control module 3011 includes a detection unit 30111.

The detection unit 30111 is configured to, when receiving the request message sent by any one of the plurality of VMs, parse the context information carried in the request message, to determine an event type of an event requested by the request message, and determine, based on the event type, the target module from the VM instance corresponding to the VM and the shared service module, and output the request message to the target module.

Optionally, the detection unit 30111 is further configured to determine whether the request message meets a security rule, where the security rule is used to describe a condition for accessing the VMM, and when the request message meets the security rule, determine, based on the event type, the target module from the VM instance corresponding to the VM and the shared service module, and output the request message to the target module, or when the request message does not meet the security rule, send error notification information to the VM that sends the request message, to notify the VM of an error cause of the request message.

Optionally, the security rule is that the request message carries security verification information.

The detection unit 30111 is configured to determine whether the context information carried in the request message includes the security verification information, and when the context information includes the security verification information, determine that the request message meets the security rule, or when the context information does not include the security verification information, determine that the request message does not meet the security rule.

Optionally, the security rule is that the request message does not carry a designated parameter, and the designated parameter is a parameter that cannot be processed by the VMM.

The detection unit 30111 is configured to determine whether the context information of the request message carries the designated parameter, and when the request message does not carry the designated parameter, determine that the request message meets the security rule, or when the request message carries the designated parameter, determine that the request message does not meet the security rule.

Optionally, the target module 303 is configured to process the request message, and when the target module is the shared service module, and the shared service module detects an update operation of designated data in a process of processing the request message, determine that there is the attack information.

Optionally, the target module 303 is further configured to, when the target module is the VM instance, and a running error of the VM instance occurs in a process of processing the request message, determine that there is the attack information.

Optionally, the target module 303 is configured to, when the target module is the VM instance, and the context information is used to indicate that the VM instance accesses information shared by the plurality of VM instances, process, by the VM instance, the request message, to obtain a first update request message.

Correspondingly, the target module 303 is further configured to send the first update request message to the shared service module when no running error of the VM instance occurs in a process of processing the request message.

The shared service module 3013 is further configured to receive the first update request message, and process the first update request message.

The shared service module 3013 is further configured to, when detecting an update operation of designated data in a process of processing the first update request message, determine that there is the attack information.

Optionally, the target module 303 is configured to, when the target module is the VM instance, and the context information is used to indicate that the VM instance accesses hardware information controlled by the MMU control module, process, by the VM instance, the request message, to obtain a second update request message.

Correspondingly, the target module 303 is further configured to send the second update request message to the MMU control module when no running error of the VM instance occurs in a process of processing the request message.

The MMU control module 3011 is further configured to receive the second update request message, and process the second update request message.

The MMU control module 3011 is further configured to, in a process of processing the second update request message, determine whether the second update request message meets the security rule.

The MMU control module 3011 is further configured to, when the second update request message does not meet the security rule, determine, by the MMU control module, that there is the attack information.

In this embodiment of the present disclosure, the VMM is divided into a plurality of mutually independent and isolated modules. The VMM is divided into the shared service module, the MMU control module, and the plurality of VM instances. The shared service module, the MMU control module, and the plurality of VM instances are mutually independent and isolated. When any one of the plurality of VMs sends the request message, the MMU control module may send the request message to the corresponding VM instance or the shared service module based on the context information of the request message. The VM instance or the shared service module may process the request message, to determine whether there is the attack information. When there is the attack information, an information protection notification message is sent to the MMU control module. When receiving the information protection notification message, the MMU control module may directly delete the VM that sends the request message and the VM instance corresponding to the VM. Therefore, the attack information occurring in the VMM is limited in a single independent module, and another module is not affected, so as to implement information protection.

It should be noted that, during information protection performed by the information protection apparatus provided in the embodiments, division of the function modules is only used as an example for description. In actual application, the functions may be allocated to different function modules for implementation, depending on a requirement, in other words, an internal structure of an apparatus is divided into different function modules to implement all or some of the functions described above. In addition, the information protection apparatus and the information protection method in the foregoing embodiments pertain to a same idea. For a specific implementation process, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a ROM, a magnetic disk, an optical disc, or the like.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

The foregoing descriptions are merely example embodiments of the present disclosure, but are not intended to limit the present disclosure. Any modification, equivalent replacement, and improvement made without departing from the principle of the present disclosure shall fall within the protection scope of the present disclosure.

What is claimed is:

1. An information protection method performed by an information protection apparatus, the information protection method comprising:
   receiving, by a memory management unit (MMU) controller of the information protection apparatus and from a first virtual machine (VM) of a plurality of VMs in the information protection apparatus, a request message comprising context information;
   parsing, by the MMU controller and in response to receiving the request message from the first VM, the context information carried in the request message to determine an event type of an event requested by the request message;
   determining, by the MMU controller and based on the event type, a target VM instance from a VM instance corresponding to the first VM and a shared service memory storing data used by the plurality of VMs;
   sending, by the MMU controller in response to receiving the request message and determining the target VM instance, the request message to the target VM instance, wherein the information protection apparatus comprises a plurality of VM instances in a one-to-one correspondence with the plurality of VMs;
   determining, by the target VM instance based on the request message, whether the request message includes attack information;
   sending, by the target VM instance, an information protection notification message to the MMU controller in response to the request message including the attack information, wherein the information protection notification message carries a VM identifier identifying the first VM; and
   deleting, by the MMU controller in response to receiving the information protection notification message, the first VM and the VM instance corresponding to the first VM.

2. The information protection method according to claim 1, wherein after parsing the context information carried in the request message, the method further comprises determining whether the request message meets a security rule describing a condition for accessing a virtual machine monitor (VMM) of the information protection apparatus.

3. The information protection method according to claim 1, wherein after parsing the context information carried in the request message, the method further comprises determining whether the request message meets a security rule describing a condition for accessing a virtual machine monitor (VMM) of the information protection apparatus, and wherein the target VM instance is determined based on the event type from the VM instance corresponding to the first VM and the shared service memory and in response to the request message meeting the security rule.

4. The information protection method according to claim 1, wherein after parsing the context information carried in the request message, the method further comprises:
  determining whether the request message meets a security rule describing a condition for accessing a virtual machine monitor (VMM) of the information protection apparatus; and
  sending an error notification information to the first VM to notify the first VM of an error associated with the request message in response to the request message failing to meet the security rule.

5. The information protection method according to claim 3, wherein the security rule indicates that the request message carries security verification information, and wherein determining whether the request message meets the security rule comprises:
  determining whether the context information carried in the request message comprises the security verification information; and
  either determining that the request message meets the security rule in response to the context information comprising the security verification information or determining that the request message does not meet the security rule in response to the context information not comprising the security verification information.

6. The information protection method according to claim 3, wherein the security rule indicates that the request message carries security verification information, and wherein determining whether the request message meets the security rule comprises:
  determining whether the context information carried in the request message comprises the security verification information; and
  determining that the request message does not meet the security rule in response to the context information not comprising the security verification information.

7. The information protection method according to claim 3, wherein the security rule indicates that the request message does not carry a designated parameter that is unable to be processed by the VMM, and wherein determining whether the request message meets the security rule comprises:
  determining whether the context information of the request message carries the designated parameter; and
  either determining that the request message meets the security rule in response to the request message not carrying the designated parameter or determining that the request message does not meet the security rule in response to the request message carrying the designated parameter.

8. The information protection method according to claim 3, wherein the security rule indicates that the request message does not carry a designated parameter that is unable to be processed by the VMM, and wherein determining whether the request message meets the security rule comprises:
  determining whether the context information of the request message carries the designated parameter; and
  determining that the request message does not meet the security rule in response to the request message carrying the designated parameter.

9. The information protection method according to claim 1, wherein the target VM instance is the shared service memory, and wherein determining, based on the request message, whether the request message includes the attack information comprises:
  processing the request message to determine whether the request message comprises an update operation of designated data; and
  determining that the request message includes the attack information in response to the request message comprising the update operation of the designated data.

10. The information protection method according to claim 1, wherein the target VM instance is the VM instance corresponding to the first VM, and wherein determining, based on the request message, whether the request message includes the attack information comprises:
  processing the request message; and
  determining that the request message includes the attack information in response to a running error of the target VM instance occurring while processing the request message.

11. The information protection method according to claim 10, further comprising:
  processing, by the VM instance corresponding to the first VM, the request message to obtain a first update request message in response to the context information indicating that the VM instance corresponding to the first VM accesses information shared by the plurality of VM instances; and
  after processing the request message:
    sending the first update request message to the shared service memory in response to a running error of the VM instance corresponding to the first VM not occurring while processing the request message; and
    determining that the request message includes the attack information in response to the shared service memory detecting an update operation of designated data while the first update requested message is being processed.

12. The information protection method according to claim 1, further comprising:
  processing, by the VM instance corresponding to the first VM, the request message to obtain a second update request message in response to the context information indicating that the VM instance corresponding to the first VM accesses hardware information controlled by the MMU controller; and
  after processing the request message:
    sending the second update request message to the MMU controller in response to a running error of the VM instance corresponding to the first VM not occurring while processing the request message;
    determining, by the MMU controller, whether the second update request message meets a security rule; and
    determining, by the MMU controller, that the request message includes the attack information in response to the second update request message not meeting the security rule.

13. An information protection apparatus, comprising:
a virtual machine monitor (VMM) configured to manage a plurality of virtual machines (VMs) and a plurality of VM instances, wherein the plurality of VM instances are in a one-to-one correspondence with the plurality of VMs, and wherein the VMM comprises:
a shared service memory comprising data that is shared by the plurality of VMs and that is unable to be stored in the plurality of VM instances and code for operating the data;
a memory management unit (MMU) controller configured to:
receive, from a first VM of the plurality of VMs, a request message comprising context information;
parse, in response to receiving the request message from the first VM, the context information carried in the request message to determine an event type of an event requested by the request message;
determine, based on the event type, a target VM instance from a VM instance corresponding to the first VM and the shared service memory;
send the request message to the target VM instance in response to receiving the request message and determining the target VM instance;
determine, based on the request message, whether the request message includes attack information; and
delete, in response to determining that the request message includes the attack information, the first VM and the VM instance corresponding to the first VM.

14. The information protection apparatus according to claim 13, wherein after parsing the context information carried in the request message, the MMU controller is further configured to determine whether the request message meets a security rule describing a condition for accessing the VMM.

15. The information protection apparatus according to claim 14, wherein the MMU controller is further configured to send an error notification information to the first VM to notify the first VM of an error associated with the request message in response to the request message failing to meet the security rule.

16. An information protection apparatus comprising:
a memory comprising instructions; and
a processor coupled to the memory and configured to execute the instructions, which cause the processor to be configured to:
receive, from a first virtual machine (VM) of a plurality of VMs in the information protection apparatus, a request message comprising context information;
parse, in response to receiving the request message from the first VM, the context information carried in the request message to determine an event type of an event requested by the request message;
determine, based on the event type, a target VM instance from a VM instance corresponding to the first VM and a shared service memory of the information protection apparatus;
send the request message to the target VM instance in response to receiving the request message and determining the target VM instance, wherein the information protection apparatus comprises a plurality of VM instances in a one-to-one correspondence with the plurality of VMs;
determine, based on the request message, whether the request message includes attack information; and
delete, in response to determining that the request message includes the attack information, the first VM and the VM instance corresponding to the first VM.

17. The information protection apparatus according to claim 16, wherein the instructions further cause the processor to be configured to determine whether the request message meets a security rule describing a condition for accessing a virtual machine monitor (VMM) of the information protection apparatus.

18. The information protection apparatus according to claim 16, wherein the instructions further cause the processor to be configured to determine whether the request message meets a security rule describing a condition for accessing a virtual machine monitor (VMM) of the information protection apparatus, and wherein the target VM instance is determined based on the event type from the VM instance corresponding to the first VM and the shared service memory and in response to the request message meeting the security rule.

19. The information protection apparatus according to claim 16, wherein the instructions further cause the processor to be configured to:
determine whether the request message meets a security rule describing a condition for accessing a virtual machine monitor (VMM) of the information protection apparatus; and
send an error notification information to the first VM to notify the first VM of an error associated with the request message in response to the request message failing to meet the security rule.

20. The information protection apparatus according to claim 19, wherein the security rule indicates that the request message carries security verification information.

* * * * *